US012608363B2

(12) United States Patent
Armbrust et al.

(10) Patent No.:  US 12,608,363 B2
(45) **Date of Patent:    \*Apr. 21, 2026**

(54) UPDATE AND QUERY OF A LARGE COLLECTION OF FILES THAT REPRESENT A SINGLE DATASET STORED ON A BLOB STORE

(71) Applicant: Databricks, Inc., San Francisco, CA (US)

(72) Inventors: Michael Paul Armbrust, Berkeley, CA (US); Shixiong Zhu, El Cerrito, CA (US); Burak Yavuz, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/985,397

(22) Filed: Dec. 18, 2024

(65) Prior Publication Data

US 2025/0156394 A1     May 15, 2025

Related U.S. Application Data

(63) Continuation of application No. 18/236,516, filed on Aug. 22, 2023, now Pat. No. 12,189,607, which is a
(Continued)

(51) Int. Cl.
*G06F 16/14*        (2019.01)
*G06F 16/22*        (2019.01)
*G06F 16/23*        (2019.01)

(52) U.S. Cl.
CPC ........ *G06F 16/2358* (2019.01); *G06F 16/148* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 7,421,446 B1 | 9/2008 | Bruso et al. | |
| 7,480,672 B2 | 1/2009 | Hahn et al. | |
| | (Continued) | | |

OTHER PUBLICATIONS

United States Office Action, U.S. Appl. No. 18/236,516, Mar. 28, 2024, 26 pages.

(Continued)

*Primary Examiner* — Scott A. Waldron
(74) *Attorney, Agent, or Firm* — Fenwick & West LLP

(57)        ABSTRACT

A system includes an interface and a processor. The interface is configured to receive a table indication of a data table and to receive a transaction indication to perform a transaction. The processor is configured to determine a current position N in a transaction log; determine a current state of the metadata; determine a read set associated with a transaction; attempt to write an update to the transaction log associated with a next position N+1; in response to a transaction determination that a simultaneous transaction associated with the next position N+1 already exists, determine a set of updated files; and in response to a determination that there is not an overlap between the read set associated with the current transaction and the set of updated files associated with the simultaneous transaction, attempt to write the update to the transaction to the transaction log associated with a further position N+2.

20 Claims, 7 Drawing Sheets

Related U.S. Application Data continuation of application No. 17/695,411, filed on Mar. 15, 2022, now Pat. No. 11,775,499, which is a continuation of application No. 16/941,227, filed on Jul. 28, 2020, now Pat. No. 11,308,071, which is a continuation of application No. 15/987,215, filed on May 23, 2018, now Pat. No. 10,769,130.

(56)         References Cited

U.S. PATENT DOCUMENTS

| | | |
|---|---|---|
| 2010/0211554 A1 | 8/2010 | Reid et al. |
| 2014/0156618 A1 | 6/2014 | Castellano |
| 2016/0085772 A1 | 3/2016 | Vermeulen et al. |

OTHER PUBLICATIONS

United States Office Action, U.S. Appl. No. 16/941,227, Aug. 2, 2021, 17 pages.
United States Office Action, U.S. Appl. No. 15/987,215, Apr. 3, 2020, 18 pages.

UPDATE AND QUERY OF A LARGE COLLECTION OF FILES THAT REPRESENT A SINGLE DATASET STORED ON A BLOB STORE

CROSS REFERENCE TO OTHER APPLICATIONS

This application is a continuation application of U.S. patent application Ser. No. 18/236,516, filed on Aug. 22, 2023, which is continuation application of U.S. patent application Ser. No. 17/695,411, filed on Mar. 15, 2022, issued as U.S. Pat. No. 11,775,499 on Oct. 3, 2023, which is a continuation application of U.S. patent application Ser. No. 16/941,227, entitled UPDATE AND QUERY OF A LARGE COLLECTION OF FILES THAT REPRESENT A SINGLE DATASET STORED ON A BLOB STORE filed Jul. 28, 2020, issued as U.S. Pat. No. 11,308,071 on Apr. 19, 2022, which is incorporated herein by reference for all purposes, which is a continuation application of U.S. patent application Ser. No. 15/987,215, now U.S. Pat. No. 10,769, 130, entitled UPDATE AND QUERY OF A LARGE COLLECTION OF FILES THAT REPRESENT A SINGLE DATASET STORED ON A BLOB STORE filed May 23, 2018, all of which are incorporated herein by reference for all purposes.

BACKGROUND OF THE INVENTION

Big data storage systems typically comprise large file repositories with minimal filesystem structure. For example, a big data storage system can comprise a key/value repository wherein a user can store a value associated with a key and retrieve the value using the key. In order to keep track of the data as changes are made, metadata is maintained to track files as they are written, updated, deleted, etc. For very large data stores (e.g., petabytes, exabytes, etc.), the metadata can easily become unwieldy, creating a problem wherein the speed of performing transactions on the big data storage becomes limited by the time required to query and/or update the metadata.

BRIEF DESCRIPTION OF THE DRAWINGS

Various embodiments of the invention are disclosed in the following detailed description and the accompanying drawings.

DETAILED DESCRIPTION

Figure 1:
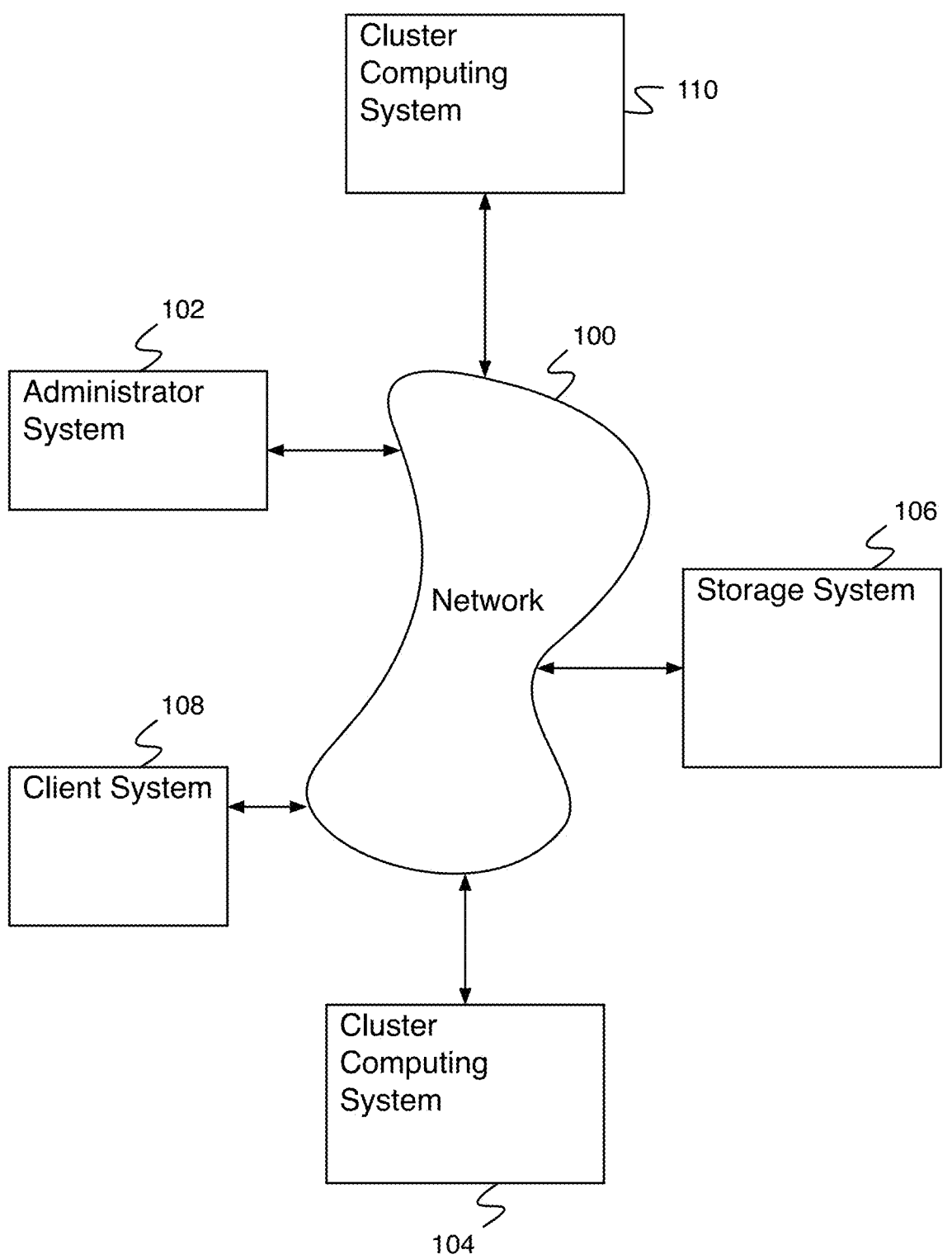
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for updating data is disclosed. The system includes an interface and a processor. The interface is configured to receive a table indication of a data table, wherein the table comprises data and metadata, wherein the metadata includes a list of files, file partitioning information, and a transaction log, and to receive a transaction indication to perform a transaction. The processor is configured to determine a current position N in the transaction log, determine a current state of the metadata, determine a read set associated with the transaction, and attempt to write an update to the transaction log associated with a next position N+1. The processor is additionally configured to, in response to a transaction determination that a simultaneous transaction associated with the next position N+1 already exists, determine a set of updated files associated with the simultaneous transaction, and in response to a non-overlap determination that there is not an overlap between the read set associated with the current transaction and the set of updated files associated with the simultaneous transaction, attempt to write the update to the transaction to the transaction log associated with a further position N+2.

A big data metadata protocol comprises a protocol for creating and updating metadata for a big data storage system. The metadata comprises a description of the current state of the storage system. The description is stored as a set of transaction files forming a transaction log, where each transaction file is associated with a sequential transaction log identifier. Each time an update is made to the database a transaction file is added to the transaction log reflecting the changes comprising the update. The transaction log identifier associated with the new transaction file comprises the transaction log identifier next in the transaction log identifier sequence. For example, a transaction log storing N updates stores the updates as N transaction files associated with transaction log identifiers 1 through N. When a new update is added it is associated with transaction log identifier N+1.

When an update transaction is performed on the big data storage system the metadata protocol ensures that the transactional guarantee is not violated by a concurrent update. A first transaction operates by reading a set of data from the storage system, performing an operation on the data, and then storing a result of the operation in the storage system. It is possible that the transactional guarantee is violated in the event that a second transaction makes a change to the data the first transaction read before the result of the first transaction is stored in the storage system. When the first transaction reads the data from the storage system, an indication of the associated read set is stored. For example, the read set comprises the search query used to locate data to be read. In some embodiments, in addition, an indication of a set of files read is stored, an indication of whether metadata was read is stored, a transaction identifier is stored, etc.

In addition, the most recent transaction log identifier is determined and stored. When the first transaction attempts to store the result of the operation, it attempts to store it with the next transaction log identifier following the determined most recent transaction log identifier. The transaction log determines whether there is already a transaction that has been stored associated with the next transaction log identifier. Determining that there is already a transaction that has been stored associated with the next transaction log identifier indicates that a second transaction has occurred and modified the big data storage system while the first transaction was processing. A set of updated files associated with the second transaction is identified (e.g., from the transaction file associated with the second transaction. The read set associated with the first transaction is then compared with the set of updated files associated with the second transaction to determine whether an overlap exists. In the event it is determined that the read set associated with the first transaction does not overlap with the set of updated files associated with the second transaction, the metadata protocol attempts to write the update to the transaction log associated with the following position N+2. Since the first transaction and the second transaction do not interact, the fact that they happened simultaneously does not matter, and therefore it does not matter which transaction is committed as the first transaction. In the event it is determined that the read set associated with the first transaction overlaps with the set of updated files associated with the second transaction, the first transaction fails. Since there is an interaction between the first transaction and the second transaction, correct behavior of the first transaction cannot be guaranteed, and the first transaction should not be committed, and there is an automatic or manual determination of whether to retry the transaction. Note the first transaction is the transaction that has not yet completed, and the second transaction is the transaction that has already been committed.

A wide variety of customer use cases would be enabled or simplified if there were an efficient and transactional way to query and modify the state of a collection of data stored as files on a data store. A big data metadata protocol allows the state of such a collection to be represented using an ordered log of atomic collections of actions (e.g., AddFile, Remove-File, etc.) that are also stored on the data store. The log is designed such that it can be read in parallel by a cluster of job executors. The log can be appended to by multiple writers that are mediated using optimistic concurrency control providing serializable valid database transactions.

A common use of a big data processing system is to update and query a large collection of files that represent a single data set and are stored on a data store (e.g., AMAZON SIMPLE CLOUD STORAGE, GOOGLE CLOUD STORAGE, or MICROSOFT AZURE BLOB STORAGE). For example, the collection of files comprises a table. Previously, there were several challenges with these kinds of workloads. For example: enumerating the list of files required to answer a query can be expensive and slow when the collection is large; readers can see an inconsistent state of the table when there are concurrent modifications; checks were not in place to make sure that new data that is added to the collection is schema compatible with data that is already there; it is difficult to handle failures and retries efficiently and correctly; and processing jobs often produce many small files that significantly impact read performance.

In some embodiments, the system satisfies the following: 1) Readers should be able to efficiently query a snapshot of the state of a table, optionally filtering by partition values—This operation should be fast both for a small number of files (e.g., 10 s) as well as a very large collection (e.g., a billion files in a billion partitions); and 2) Writers should be able to transactionally modify the state of a table, possibly from multiple clusters—The rate of modifications assumed to be is relatively small (i.e., a few per second per table). It should be possible for external tools (e.g., hive, presto, spectrum, etc.) to read a best effort snapshot of the data. However, enabling this optional feature will necessarily limit the ability of the system to read stale snapshots of the data. In some embodiments, the system is backwards compatible, in that newer versions must be able to read all old versions of the log. Additionally, it should be possible to add features (e.g., bucketing—a type of prepartitioning of data) to the system. Full-forward compatibility is a non-requirement, but users should receive a clear error message when forward compatibility is broken by enabling a new feature instructing them to upgrade.

In some embodiments, the system is implemented as a library that is packaged inside of a container. This library communicates with the data store, and optionally with a central coordination service.

The following is a list of different interface boundaries exposed by sub-components of the architecture. The big data metadata protocol is a set of actions that change the state of a transaction log. These actions can be grouped together in ordered atomic units and are stored in a directory. The log store is a service to get/put/list an ordered collection of atomic units that are stored in the data store. Higher level operations (e.g., idempotent append, replace partition, compaction, etc.) are allowed to query the state of the table, and then commit an atomic set of changes. In the case of conflicts, operations may fail and request the user to try again. The specifics of what types of conflicts can occur and which levels are able to provide specific remediation are discussed.

In some embodiments, the protocol requires the following from the big data storage system. In some cases where the requirements are not met, the protocol can be implemented by implementing the missing service for that particular system. For example, while AMAZON S3 does not provide mutual exclusion, this requirement can be satisfied by using a centralized commit service. Atomic File Creation: the protocol requires that atomic unit files are created atomically in order to support atomicity of higher level operations. When atomic creation is not available this can also be satisfied by atomic rename. Mutual Exclusion: two clients must not both succeed at creating the same atomic file, as this would violate the requirement for a single linear history. Partial Listing: an arbitrarily large number of atomic unit log entries may be retained both for provenance information and to allow users to read old snapshots of the table. As such, for good performance the big data storage system are required to allow the listing of files in lexicographic order starting at a given file name.

In some embodiments, the current state of the table is defined as follows: The current metadata, including: the schema of the table, a unique identifier, partition columns, and other configuration properties (e.g., whether the table is append only). The files present in the table, along with metadata about those files, including the size of the file, partition values, statistics. Tombstones, which indicate that file was recently deleted and should remain temporarily to allow for reading of stale snapshots. And applications specific transaction versions, which allow applications such as a structured streaming to make changes to the table in an idempotent manner. The state of the table is changed by appending a new atomic file to the log for a given table. Atomic files contain actions, such as adding or removing a file. Most importantly, atomic files are the unit of atomicity (i.e., each atomic file represents a set of actions that will all happen atomically).

The log is stored in a directory on the big data storage system. This would typically be at the same location as the root of the partitioned data files, though that is not a strict requirement. In order to modify the state of the table, a writer must append an atomic file that contains an unordered list of actions. In some embodiments, atomic files are named using consecutive integers and are zero padded to allow for efficient ordered enumeration. For example:

dbfs:/mnt/streaming/tahoe/usage/_delta_log/
00000000000000000000.json
dbfs:/mnt/streaming/tahoe/usage/_delta_log/
00000000000000000001.json
dbfs:/mnt/streaming/tahoe/usage/_delta_log/
00000000000000000002.json Files are written atomically and are named using consecutive numbers and the log store ensures that concurrent writers are unable to successfully write the same atomic file, creating a linear history for the table. The state of the table is defined as the result of replaying all of the actions in the log in order.

A file operation adds or removes a path from the table. The add file operation also includes information about partition values and statistics such as file size that are useful in query planning. Files are defined to be unique by the path (and thus the same path may not exist in a table twice). This restriction means metadata of a file can be updated by adding it again in a subsequent atomic file. In this case, when a duplicate path is observed in a later update the metadata of the latest action defines the new state of the table. In some embodiments, relative paths are assumed to be based at the parent of the atomic file log directory. This allows the log to work with mount points or external file operations (e.g., cp or mv) that move the entire collection of data. In some embodiments, absolute paths are supported.

Removal of a file also includes a tombstone timestamp that indicates when the deletion occurred. Physical deletion of the file can happen lazily after some user specified time threshold. This delay allows concurrent readers to continue to execute against a stale snapshot of the data. This tombstone should be maintained in the state of the table until after the threshold has been crossed. Since actions within an atomic file are not guaranteed to be applied in order, it is not valid for multiple file operations with the same path to exist in a single atomic file. The data change flag is used to indicate that an operation only rearranges existing data or adds new statistics, and does not result in a net change in the data present in the table. This flag is useful if the transaction log is used as a source for a streaming query. In some embodiments, statistics include an encoded set of statistics about the file. In some embodiments, clients should always assume that statistics can be missing.

In some embodiments, the ability to make the application of a delta file idempotent is a useful primitive. Example use cases include both streaming appends and directly allowing users to build fault tolerant data pipelines. These use cases are enabled by tracking a version for a user-specified application identifier. For any given application identifier the table state tracks the most recent version. Modifications to this version can be atomically committed along with other actions such as appends to make them idempotent. The semantics of the version number are the responsibility of the higher layer and the log replay should not make an assumptions other than last update wins and concurrent modifications should fail. For example, the protocol does not assume monotonicity and it would be valid for the version to decrement, "undoing" a given operation.

In some embodiments, every application identifier is maintained forever, assuming that the number of streams that write into a table would be small. If the transactions are exposed to users, this may not be true for a very long lived table. In some embodiments, a solution adds a mechanism to expire transactions after a fixed period of time.

The metadata of the table contains information that identifies its contents or controls how the data is read (i.e., use of JavaScript object notation (json) or parquet). The metadata of the table is defined as the metadata action found in the most recent delta that contains one.

In some embodiments, metadata is omitted from the log and instead another system is used for this information. This omission, however, makes it difficult to guarantee the integrity of certain operations such as changing the partitioning of a table or concurrent appends that modify the schema. It also means that collections of files cannot be self-describing, necessitating the long-term use of the metadata store for all workloads. Another possible variation includes storing metadata along with each file. This variation would allow for heterogeneously encoded tables.

In some embodiments, the protocol versioning action allows for a newer client to exclude older readers and/or writers. An exclusion should be used whenever non-forward compatible changes are made to the protocol. In the case where a client is running an invalid version, an error should be thrown instructing the user to upgrade to a newer version of the metadata protocol.

Commits can optionally contain additional provenance information about what higher level operation was being performed as well as who executed it. This information can be used both when looking at the history of the table as well as when throwing a concurrent modification exception.

As the number of atomic files grows, it becomes increasingly expensive to reconstruct the current state of the table from scratch. In order to mitigate this problem, the system will regularly produce a checkpoint file, which contains the current state of the log up until some version. Future readers can start with this file and only read atomic files that come afterwards.

When producing a checkpoint up to a particular atomic file, the most recent atomic file should first be committed in order to ensure that all writers agree on what the contents of the checkpoint should be. Ensuring that checkpoints are deterministic means that the requirements on creation can be relaxed. In particular, there is no need for mutual exclusion when producing a checkpoint. If multiple writers try and create the same checkpoint, it does not matter which one wins.

For small tables the checkpoint can be constructed and written out by the driver. Once a table grows past a certain threshold, the system can switch to producing the checkpoint using multiple executors.

Metadata about the last checkpoint that was written out is stored in a last checkpoint file, including the last checkpoint version and its size. This information allows repository to keep a long history of without increasing the cost of loading the current state. As this is only an optimization, correctness problems do not occur if the last checkpoint file is stale due to concurrent writers or eventual consistency.

By ordering the checkpoint, it is it possible to use the action log as the list of new files when using the table as a source for a structured streaming query. Sorting allows the checkpoint to be deterministically indexed in order to split it into batches. The advantage of using the log this way is that the source does not need to maintain a list of all of the files that have been read. It is additionally possible to assign multiple systems to write a single checkpoint in parallel in order to increase the speed of the checkpoint process for very large log files.

The log store, which is responsible for storing, listing, and retrieving the list of atomic files for a given table, must ensure that there are no physical conflicts. These conflicts would occur if two writers both believed that they succeeded in committing the same atomic file. This exclusion must be maintained even across different versions of the client. The functionality of maintaining the log store is built as a service executed by one or more clusters. In some embodiments, it can be executed by the big data storage system itself.

A system of the processing system is responsible for replaying ordered sets of actions that have been retrieved from the log store. It also monitoring for new atomic files in order to reconstruct the current state of the table. This state can be queried using a programming interface provided by the system.

In order to modify the table, a user opens a transaction, which does the following: First, the transaction updates to the latest log version and records the version number as the starting version. Second, the transaction records all reads that occur to the transaction log. Third, the transaction provides an interface that allows a new sequence of actions to be atomically committed. When the commit method is called, the system checks to make sure there are no logical conflicts with other transactions that have committed since the transaction began. The conflict detection algorithm is as follows:

If the log protocol version was upgraded, it can be determined whether the system is still at an acceptable version. If metadata was read and has been changed, throw a metadata changed exception. If new files have been added that the filter expressions would have read, throw a concurrent append exception. If files have been deleted that match the filter expression throw a concurrent read delete exception. If a file would be deleted twice throw a concurrent delete exception. If an overlapping transaction has been detected (i.e., transactions with the same transaction identifier) throw a concurrent transaction exception. Otherwise, attempt to commit at the next available atomic file version. If another concurrent writer has written that atomic file version, the check is repeated until the commit succeeds or a conflict is detected.

In the case of concurrent modification failure, higher level operations can resolve semantic conflicts by reexamining the state of the table and optionally retrying. This relaxes the strict serializability without sacrificing correctness of the operation. Some examples include:

Compaction: read the metadata and the set of files; for any files that are smaller than some threshold, bin pack them to meet that threshold and rewrite them as larger files; attempt to commit the corresponding add/remove actions. In the case of failure, this operation does not need to be serializable with other appends, so only ensure the metadata is unchanged and no compacted files have been deleted before retrying.

Atomic and validated appends of the data in a frame to a table: read the schema of the table; if the schema is incompatible with the schema of the frame throw an error; if the schema is different but compatible with the schema of the frame, merge and add change to list of actions that will be committed; read partitioning and write files out optimistically; attempt to commit optional schema modification and list of files added; on metadata changed exception, recheck new partitioning and schema and conditionally repeat.

Streaming idempotent appends: same as atomic and validated appends, but read the transaction identifiers using the stream's unique identifier and batch identifier, and skip the append if the version number is greater than the batch identifier.

Atomic replace of one or more partitions: Same as compaction, but also filter files by partition predicate and include appropriate remove file actions.

Streaming complete mode or batch overwrite of whole table: filter using predicate "true" and add remove file for all files; write out batch and create new files; set the metadata based on the schema of the batch; write out all actions.

Partial solutions to some of the problems solved by the big data metadata protocol have been attempted, including:

parallel file listing: by enumerating files in a distributed fashion, the amount of time required to query a large collection is reduced. However, this technique is still slow and costly.

Metadata Caching: using a cache of files and their partition values allows repeated queries to be sped up, but has the issues of cache invalidation and inefficient use of memory.

Hive partition handling: by storing information about interesting partitions of the data (i.e., by date) in a data, in which a subset of the directories that need to be read for a given query can be quickly enumerated. This technique however only solves consistency problems when they modify a single entire partition and requires still requires listing of the individual files.

Streaming metadata log: structured streaming ensures exactly one semantic for distributed writes of files by maintaining a log that records which data files are valid. This mechanism provides a consistent snapshot of the data, and avoids the cost of listing. However, the protocol only supports a single stream writer, and cannot handle any other modifications (e.g., another stream, batch jobs, or file utilities like cp or rm).

Directory commit protocol: the directory commit protocol allows a collection of appends in a single directory to become atomically visible. It however cannot prevent conflicts such as concurrent read or delete, which are required for safe compaction of small files into larger ones. It also exacerbates the cost of file listing.

Data skipping index: a collection of files are stored on the big data store that act as the authoritative source for which files are part of a table as well as for useful statistics (e.g., minimum/maximum values for columns) for the data in those files. Using this information the list of files that need to be read by a query can be efficiently enumerated. The implementation is not able to detect certain conflicts, including read/delete or incompatible schema changes.

There are several alternatives to using a log as the source of truth for the state of a table. An implementation of data skipping writes out state files with random file names that will never conflict. This implementation is simpler and would support a higher level of write concurrency, however it is not capable of detecting important kinds of conflicts, including: read/delete conflicts, which would occur when concurrent compactions apply to the same file, or when two users concurrently attempt to atomically replace the same partition; or conflicting metadata changes—without an ordering of operations, strong validation of appends concurrent with updates to the schema of a table cannot be performed. If a relatively low level of write concurrency for a given table can be assumed then having a serializable history of modifications can simplify reasoning about concurrency.

The log also makes it much easier to build higher level primitives that rely on understanding the history of a table. Some examples include: provenance—who/when/how this table was changed; roll-backs—undoing the last change; and stream healing—reprocessing a section of the stream using new code.

Alternative designs might choose to store metadata somewhere other than the big data store—for example, in a relational database store. There are several reasons this might be advantageous: databases support indexing and thus could very quickly filter the list of files without performing a full table scan; and databases have native support for transactions and thus might be an easier substrate to use compared to an eventually consistent blob store.

However, there are several reasons why storing the metadata alongside the data on the big data store is a better design choice: for very large tables, extracting the list of files out of a database can rapidly become the bottleneck. In contrast, rapidly reading and filtering large collections of records from a big data store is very fast. For exactly this reason, the current data skipping implementation also chooses to store the list of files on the big data store. Furthermore, having the big data store be the authoritative source does not prevent future versions of the client library that maintain an indexed cache of the collection of files. Additionally, colocating metadata with the data has very nice properties when interacting with a table using existing infrastructure and external tools. For example, a table can be remounted at different locations, possibly on a different cluster, without losing any transactional guarantees. Deleting data works as expected and has no extra invalidation requirements. Large collections of data can be moved between different clouds.

Another criterion that should be used to evaluate the big data metadata protocol against alternative designs is the level of consistency provided by the system. The choice to have a single linear history of modifications to a table inherently limits the rate at which writers may concurrently modify it. As an example of an alternative design, both the directory commit protocol and the data skipping index allow multiple writers to append to a table with no coordination. The downside to allowing this kind of concurrency is that it makes it impossible to detect useful types of conflicts, including but not limited to the following: read/delete conflicts need to be detectable if building a compaction mechanism is desired that doesn't corrupt the table when run concurrently by two different users; and conflicting changes to metadata could occur when two appends both add a column with the same name but incompatible types. The big data metadata protocol chooses a stronger consistency model for several reasons: operations on the table are expected to be fairly large and thus an update rate of a few transactions per second is within the expected workload; explaining the types of operations that are safe to users is vastly easier when there is a simple linear history; for cases where a higher update rate needs to be handled, there are several composite architectures possible: for a fast rate of ingestion, it is common to have an input system accept many small writes, which then can be appended to the log in large batches; for update heavy workloads, a relational database store or another operation store could be used as a temporary home for writes that are compacted into the table in larger batches.

Instead of building this feature as a library, it could be built using a central service that acts as the authoritative source for metadata. There are several advantages to this architecture: It is much easier to control the version of the persistent state when exactly what version of the code is running can be controlled. The service controls when the code is going to be updated instead of relying on the user to upgrade the database version. Furthermore, it can be ensured that there is only one version ever active at a time in a cluster. Additionally, it is likely cheaper to check transactions for conflicts and optimistically retry when there is a central point of coordination. In the current design, the latency between a given client and the big data store will likely result in more wasted work when resolving conflicts.

A decision to implement the protocol using a library may be made for the following reasons: Extracting a large list of files from a central service would likely become the bottleneck for large tables, similar to if a database service is used as the source of truth. Deploying new services (especially those that might have high network and memory requirements) would be very difficult, especially if support is desired for all of the available deployment modes. A processing cluster can easily be configured to have the memory required to filter billions of files unlike the machines that run central services. As long as this service maintains the invariant that only a single writer can produce a given delta file when used concurrently with older clients, a central service could be added later to decrease the cost of transaction conflict resolution or enable the maintenance of secondary indexes.

Instead of using optimistic concurrency, a pessimistic mechanism using locks could be used. The advantage would be less wasted work in the case of conflicting operations. However, optimistic concurrency control is a good choice for the following reasons: the vast majority of operations (likely mostly streaming appends) will not conflict and thus very little work will be wasted; and holding locks and handling expiration across different clusters can be very difficult, especially with long running transactions and the possibilities of long garbage collection pauses. Metrics should be tracked that allow an administrator to empirically understand how often work is wasted due to conflicting transactions so that the system can be adjusted if the assumptions turn out to be wrong. In addition locks can be added to prevent wasted work in the future as an additional layer of concurrency control.

In some embodiments, in terms of usage metrics, a load table metric is used to track usage of the metadata protocol over time. Using this information it can be understand how many tables there are, how large they are and if people are using old clients. A commit delta metric is used to track the rate and size of updates over time, and how costly the logical conflict resolution is. An unresolvable conflict metric is used to track failures due concurrent writers. A protocol failure metric is used to track how disruptive upgrading the protocol version is. A table operator metric is used to track how long to run a table operator.

Updatability is a significant concern for the big data metadata protocol. The protocol needs to be able to handle multiple concurrent readers or writers that can be using different versions of the client. Several techniques are used to case updatability. A simple base primitive is used for concurrency control such that all clients must go through a service that ensures that only one writer may produce a given delta file. Formats can evolve. The data read services have the ability to read data using schema and fill in missing information with nulls. Clients can therefore read logs that have missing or extra fields. By default it is assumed that new fields are not breaking changes to the protocol. Explicit protocol versioning. The log contains an explicit required minimum reader version and minimum writer version that allow newer clients to force older clients to upgrade in order to block invalid usage in the case of breaking changes to the protocol. In addition to exclusion, this mechanism provides a useful error message asking the user to upgrade.

In some embodiments, prototype testing the big data metadata protocol was found to improve performance over a previous protocol by at least factor of 15 in data importing and a factor of 4 in data reading.

The system improves a cluster computer system by enabling the handling of large files and ensuring that conflicts are avoided. In particular, multiple processes that access the same data are able to be checked and guaranteed to not have conflicts prior to writing out updates to data. Conflicts are resolved by restarting conflicting processes before any writes occur.

FIG. 1 is a block diagram illustrating an embodiment of a network system. In some embodiments, the network system of FIG. 1 comprises a system for a big data metadata protocol. In the example shown, a user using a client system 108 requests a job or action from a cluster computing system (e.g., cluster computing system 104, cluster computing system 110, etc.). The cluster computing system executes commands to perform the job or action and the job or action accesses data stored using storage system 106. Prior to allowing the job or action to write data, metadata information is used to determine whether another executing job may potentially modify data that is modified by another simultaneous process. A block of the executing job or action occurs in the event that something has already happened—so that if a job or action finishes before another job or action, then that will block the competing action (i.e., optimistic concurrency control). In the event that there is a potential conflict in access, the job or action that has not yet completed in the potential conflict is terminated and may be restarted. In the event that there is not a potential conflict in simultaneously writing, the job continues.

FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, cluster computing system 110, storage system 106, and client system 108 communicate via network 100. In the example shown, administrator system 102 comprises an administrator system for use by an administrator. Administrator system 102 comprises an administrator system for executing administrator commands, for executing jobs using cluster computing system 104 or cluster computing system 110, for executing a streaming query on cluster computing system 104 or cluster computing system 110, for querying the status of jobs on cluster computing system 104 or cluster computing system 110, for storing data on storage system 106, for retrieving data from storage system 106, etc. Cluster computing system 104 and cluster computing system 110 comprise cluster computing systems for executing cluster computing jobs. In some embodiments, cluster computing system 104 and cluster computing system 110 comprise cluster computing systems for searching data, reading data, writing data, updating data, etc. Cluster computing system 104 and cluster computing system 110 comprise computers, multiprocessor computers, pluralities of computers, pluralities of multiprocessor computers, etc. In some embodiments, cluster computing system 104 or cluster computing system 110 comprises a plurality of individual cluster systems. Cluster computing system 104 and cluster computing system 110 access and store data on storage system 106. Storage system 106 comprises a storage system for storing data. Storage system 106 comprises a database system, a distributed storage system, a cloud storage system, a big data storage system, etc. Client system 108 comprises a client system for use by a cluster computing system client. A cluster computing system client requests jobs on cluster computing system 104 via client system 108.

Figure 2:
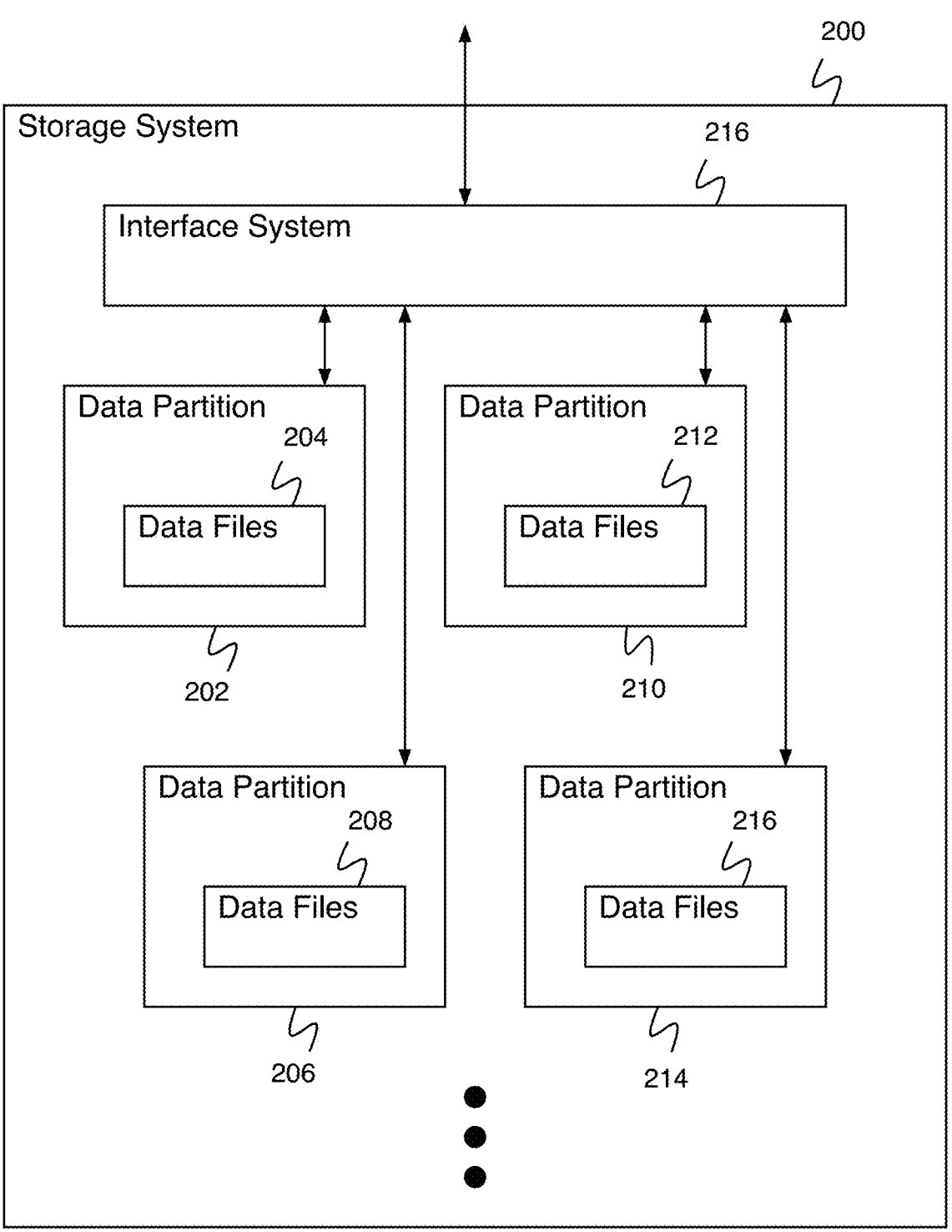
FIG. 2 is a block diagram illustrating an embodiment of a storage system.

FIG. 2 is a block diagram illustrating an embodiment of a storage system. In some embodiments, storage system 200 comprises storage system 106 of FIG. 1. In the example shown, a user using a client system requests a job or action from a cluster computing system. The cluster computing system executes commands to perform the job or action and the job or action accesses data stored using storage system 200. Prior to allowing the job or action to write data, metadata information is used to determine whether another executing job may potentially write to the same data. In the event that there is a potential conflict in writing, one of the jobs or actions in the potential conflict is terminated and can be manually or automatically restarted depending on the system implementation. In the event that there is not a potential conflict in writing, the job continues.

Storage system 200 comprises a plurality of data partitions (e.g., data partition 202, data partition 206, data partition 210, and data partition 214). Each data partition comprises one or more data files (e.g., data partition 202 comprises data files 204, data partition 206 comprises data files 208, data partition 210 comprises data files 212, and data partition 214 comprises data files 216). Storage system 200 comprises any appropriate number of data partitions (e.g., 1, 2, 3, 12, 19, 66, 100, 1000, 1000000, etc.). Each storage system stores any appropriate number of data files (e.g., 1, 5, 15, 99, 400, 50000, 50000000, etc.). Data stored in data files can be combined to form a data structure (e.g., a data table). In some embodiments, the data structure (e.g., the data table) is scalable to hold large data sets (e.g., gigabytes of data, terabytes of data, petabytes of data, or exabytes of data). Storage system 200 additionally comprises metadata describing stored data. For example, metadata comprises a list of files, file partitioning information, a transaction log, file statistical information, column minima, column maxima, a count of rows, average data length per column, a count of null cells per column, a data histogram, a number of distinct values per column, bloom filter data, a transaction identifier, a column invariant, a table schema, etc. Metadata is stored in a data partition with other data, in a data partition by itself, in a metadata storage area, or in any other appropriate area of storage system 200. Storage system 200 additionally comprises interface system 216. Interface system 216 comprises an interface system for communicating with data partitions and with an external communications system (e.g., with network 100 of FIG. 1). In some embodiments, data comprises tombstone data, e.g., data indicating that a file has been deleted recently.

Figure 3:
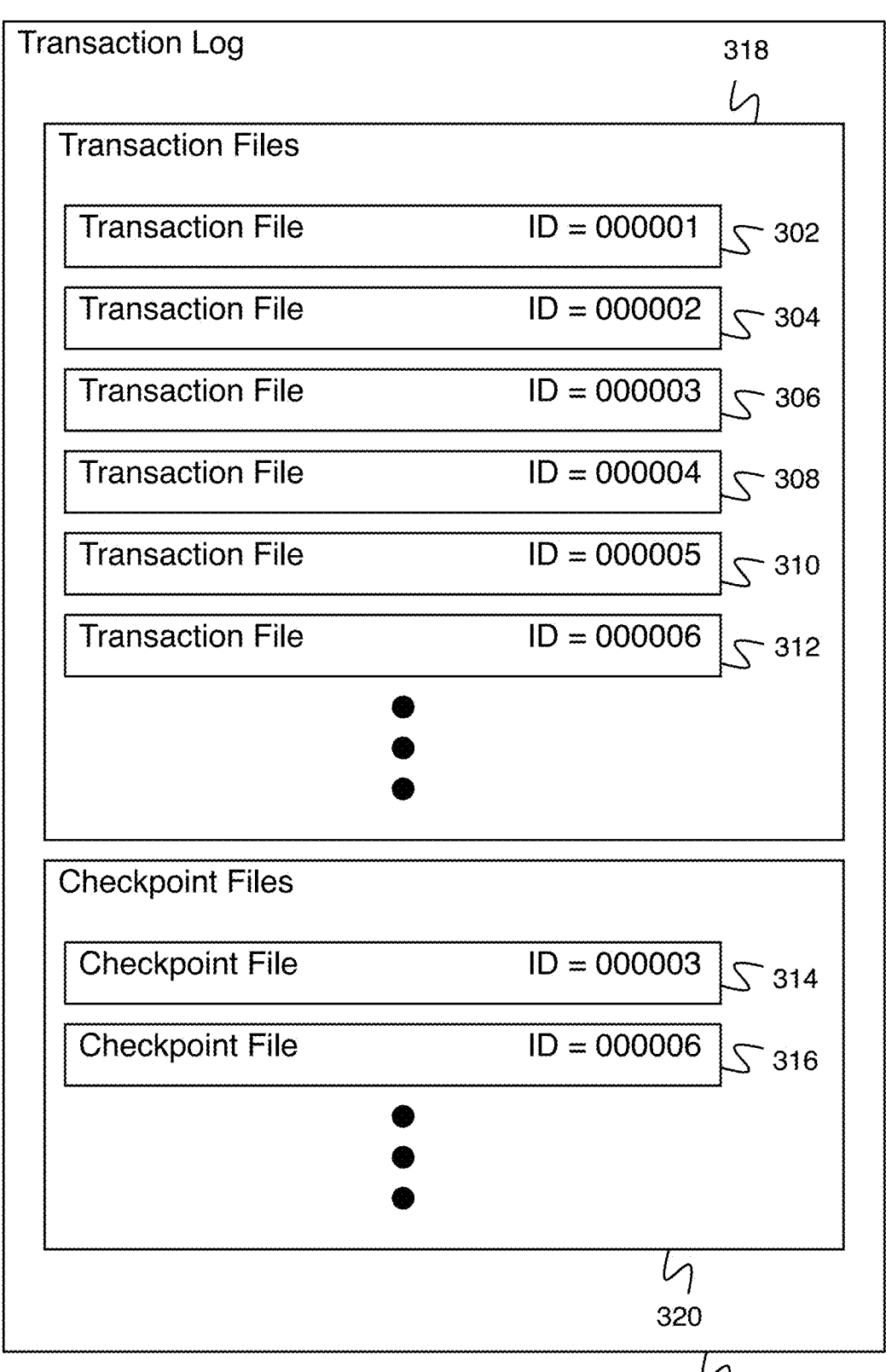
FIG. 3 is a block diagram illustrating an embodiment of a transaction log.

FIG. 3 is a block diagram illustrating an embodiment of a transaction log. In some embodiments, transaction log 300 comprises a transaction log of metadata of a storage system (e.g., storage system 200 of FIG. 2). For example, a transaction log comprises an ordered list of update files, wherein each update file is associated with a consecutively assigned position number. In the example shown, transaction log 300 comprises transaction files 318 and checkpoint files 320. Transaction files 318 comprises a set of transaction files (e.g., transaction file 302, transaction file 304, transaction file 306, transaction file 308, transaction file 310, transaction file 312). Each transaction file is associated with an identifier (e.g., transaction file 302 is associated with identifier 000001, transaction file 304 is associated with identifier 000002, transaction file 306 is associated with identifier 000003, etc.). Identifiers are assigned to transaction files sequentially (e.g., when a transaction file is added to the transaction log, its associated identifier is the next available identifier. In some embodiments, the transaction file identifier is stored as the transaction file name. The transaction log does not store two transaction files associated with the same identifier (e.g., in the event a process attempts to store an transaction file associated with an identifier associated with an already stored transaction file, the transaction log returns an error and does not store the transaction file). Each transaction file comprises an atomic database update (e.g., a database update wherein all changes to the database are applied inseparably). The current state of the database can be determined by starting with a blank database and applying the changes of each transaction file sequentially until the most recent transaction file has been applied. The transaction log can be queried to determine the identifier associated with the most recent transaction. For example, a process can attempt to add a transaction file to the transaction log, and in the event that the identifier that would be associated with the transaction file attempting to be added is the expected identifier (e.g., in the event that that no additional changes have been added to the transaction log), then the process proceeds. In the event that the identifier that would be associated with the transaction file attempted to be added is not the expected identifier, then the process is restarted and a new identifier is assigned. Each transaction file comprises an indication of a creation of a file, an update of a file, a deletion of a file, etc. Transaction files 318 comprises any appropriate number of transaction files (e.g., 1, 20, 400, 100000, etc.). Transaction log 300 additionally comprises checkpoint files 320. Checkpoint files 320 comprises checkpoint file 314 and checkpoint file 316. Each checkpoint file is associated with an identifier (e.g., checkpoint file 314 is associated with identifier 000003 and checkpoint file 316 is associated with identifier 000006). Each checkpoint file comprises a data state associated with a set of transaction files. For example, each checkpoint file comprises the data state determined by starting with a blank database and applying the changes of each transaction file sequentially until the transaction file with the same identifier as the checkpoint file is reached. For example, creating a checkpoint file comprises starting with a blank database and applying the changes of each transaction file sequentially until the most recent transaction file is reached, then assigning the checkpoint file the identifier associated with the most recent transaction file (i.e., if the last transaction file was t.10 then the checkpoint file would be c.10). A checkpoint file may be created by starting not with a blank database but with the most recent checkpoint file, then applying the changes of each subsequent transaction file. Checkpoint files 320 comprises any appropriate number of checkpoint files (e.g., 1, 2, 6, 17, 122, etc.). Checkpoint files may be created on a regular schedule (e.g., every morning, every Sunday morning, etc.), every time a certain number of transaction files are created (e.g., every 5 transaction files, every 50 transaction files, etc.), any time a processor has extra bandwidth, etc. Checkpoint files are used to allow fast database reconstruction from the transaction files (e.g., when a current or previous state of the database needs to be determined, transaction files are replayed from the most recent checkpoint file before the desired state, rather than from the first transaction file). In some embodiments, transaction files whose effects have been captured by a checkpoint file are deleted or marked for future deletion.

Figure 4:
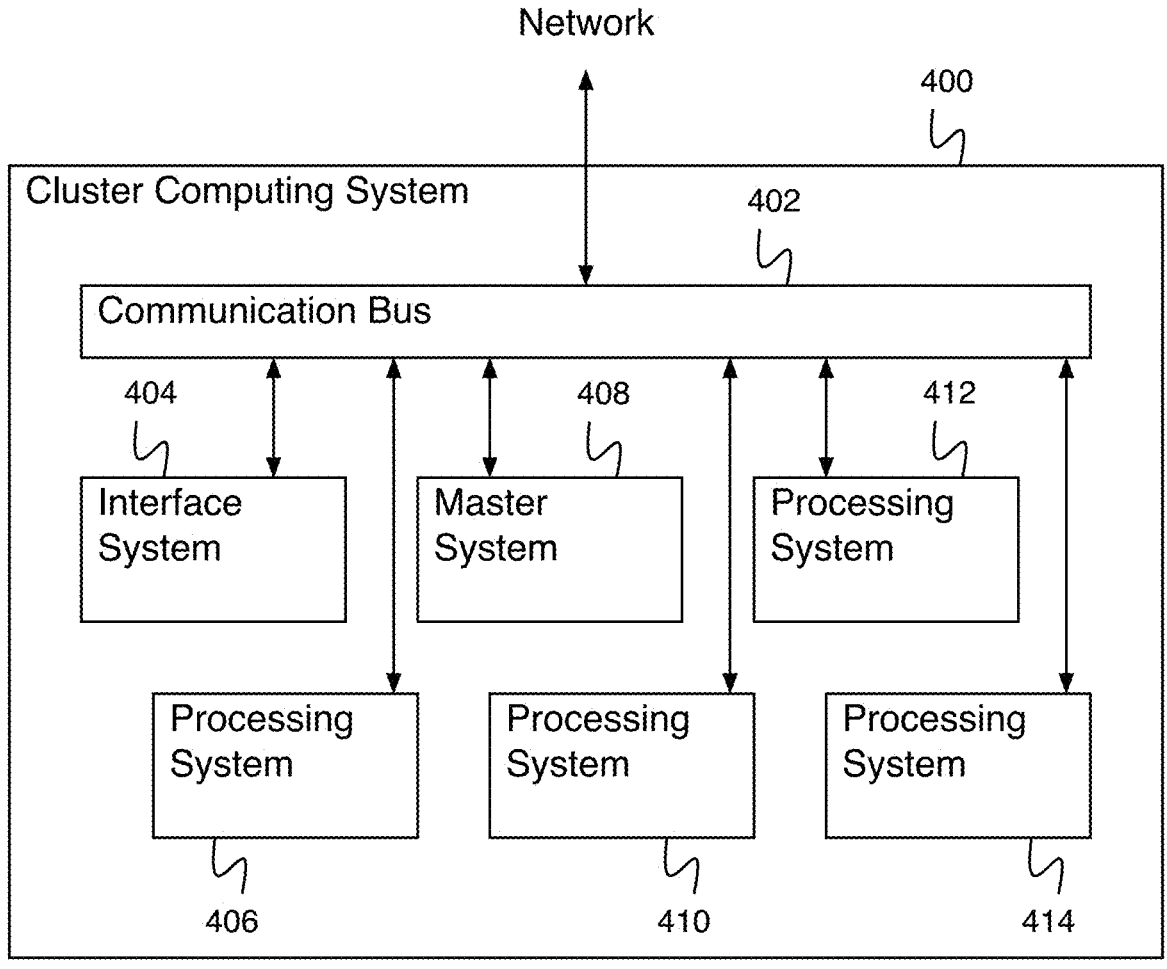
FIG. 4 is a block diagram illustrating an embodiment of a cluster computing system.

FIG. 4 is a block diagram illustrating an embodiment of a cluster computing system. In some embodiments, cluster computing system 400 comprises cluster computing system 104 of FIG. 1 or cluster computing system 110 of FIG. 1. Cluster computing system 400 comprises communication bus 402, interface system 404, master system 408, and a plurality of processing systems (e.g., processing system 406, processing system 410, processing system 412, and processing system 414). Communication bus 402 comprises a communication bus for allowing the other elements of cluster computing system 400 to communicate with each other and with an external network. Interface system 404 comprises a system for transmitting and receiving data via a network. Master system 408 comprises a master system for orchestrating cluster computing jobs (e.g., dividing jobs into job portions, assigning jobs or job portions to processing systems, receiving job results or job portion results, assembling job portion results to determine job results, etc.). Each processing system comprises a processing system that processes a job or a job portion to determine job results or job portion results.

Figure 5:
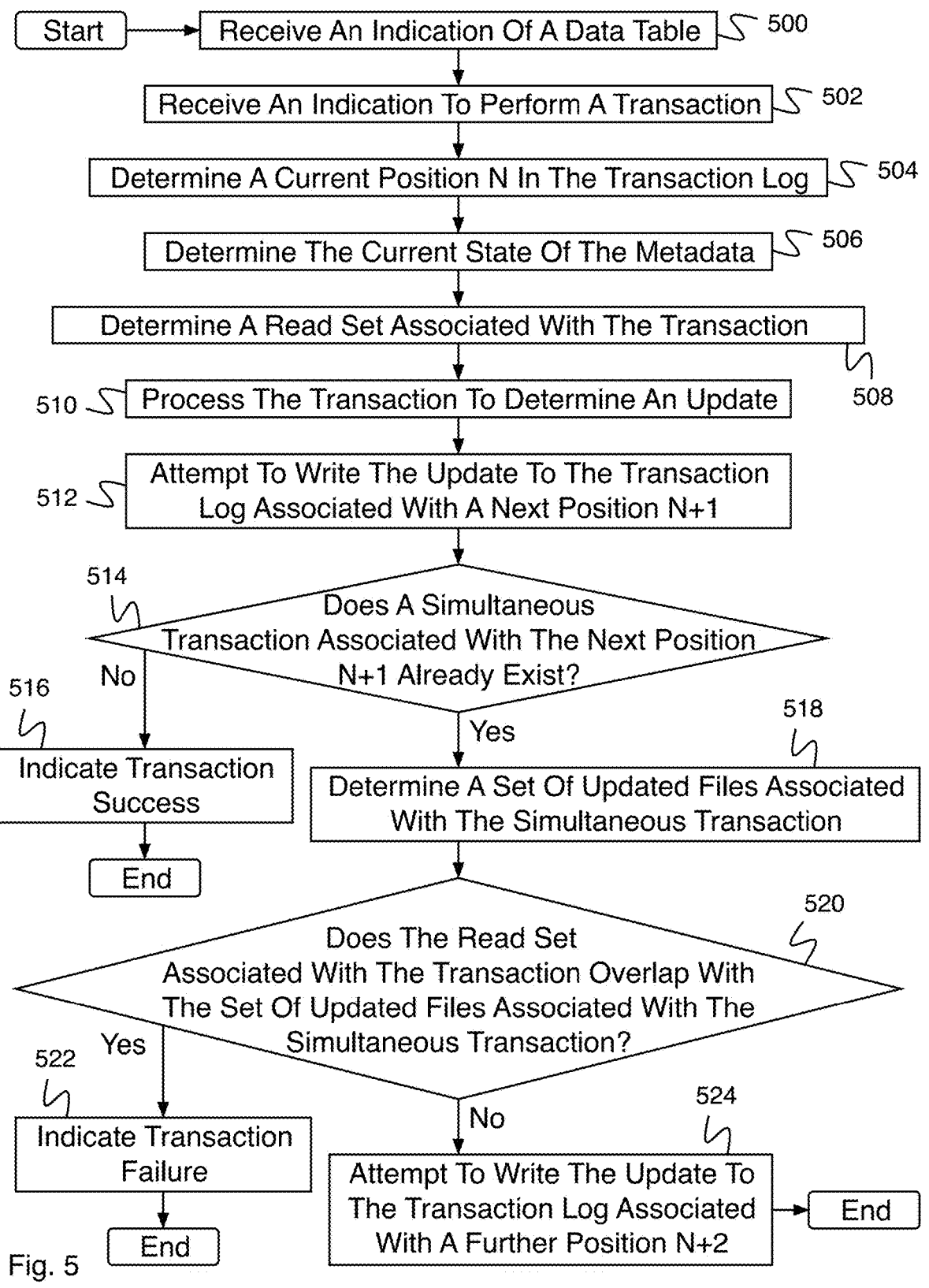
FIG. 5 is a flow diagram illustrating an embodiment of a process for updating data.

FIG. 5 is a flow diagram illustrating an embodiment of a process for updating data. In some embodiments, the process of FIG. 5 is performed by a cluster computing system (e.g., cluster computing system 104 of FIG. 1 or cluster computing system 110 of FIG. 1) for updating data on a table (e.g., a table stored on storage system 106 of FIG. 1). In some embodiments, a plurality of cluster computing systems is configured to update data on the table. In the example shown, in 500, an indication of a data table is received. In some embodiments, the data table is stored using data files of the storage system. For example, the data table comprises data and metadata, wherein the metadata includes a list of files, file partitioning information, and a transaction log. In 502, an indication to perform a transaction is received (e.g., from a user using a user system). In 504, a current position N in the transaction log is determined. The current position N in the transaction log corresponds to the identifier associated with the most recent transaction file in the transaction log. In 506, the current state of the metadata is determined. In 508, a read set associated with the transaction is determined. For example, a read set comprises a search query or a search predicate used to determine files to read (or modify or delete) for processing the transaction. In some embodiments, determining a read set associated with the transaction additionally comprises determining other information associated with the transaction (e.g., determining whether metadata was read by the transaction, determining a set of files read by the transaction, determining a transaction identifier, etc.). In 510, the transaction is processed to determine an update. In 512, an attempt is made to write the update to the transaction log with a next position N+1. For example, the process determines a transaction file associated with the update and attempts to write the transaction file to the transaction log with an identifier associated with the next position N+1. In 514, the process determines whether a simultaneous transaction associated with the next position N+1 already exists. For example, the process determines whether a transaction file already exists in the transaction log with the next position N+1 (i.e., whether another transaction file has been added to the transaction log since the current position N in the transaction log was determined in 504). In some embodiments, a process for determination whether a transaction file already exists in the transaction log with the next position N+1 is based at least in part on a table data store type (e.g., one of AMAZON SIMPLE CLOUD STORAGE, GOOGLE CLOUD STORAGE, MICROSOFT AZURE BLOB STORAGE, etc.). For example, some table data store types support a command to write a file only if it is not already present, and some table data store types require an explicit query for the file to be performed to determine if it is present. In the event it is determined that a simultaneous transaction associated with the next position N+1 does not already exist, control passes to 516. In 516, the process indicates transaction success, and the process ends. In some embodiments, the check of the transaction log and the creation of the file are atomic so that there is no race condition between these events.

In the event it is determined in 514 that a simultaneous transaction associated with the next position N+1 already exists, control passes to 518. In 518, a set of updated files associated with the simultaneous transaction is determined. For example, a set of updated files associated with the simultaneous transaction is determined by reading the transaction file in the transaction log associated with the simultaneous transaction (e.g., associated with the next position N+1). In 520, it is determined whether the read set associated with the transaction overlaps with the set of updated files associated with the simultaneous transaction. For example, it is determined whether any of the updated files would have been identified by the read set (e.g., and used as input for processing the transaction). In the event it is determined that the read set associated with the transaction overlaps with the set of updated files associated with the simultaneous transaction, control passes to 522. In 522, the process indicates transaction failure (e.g., that the transaction conflicted with the simultaneous transaction), and the process ends. In the event it is determined in 520 that the read set associated with the transaction does not overlap with the set of updated files associated with the simultaneous transaction, control passes to 524. For example, determining that the read set associated with the transaction does not overlap with the set of updated files associated with the simultaneous transaction indicates that the transaction and the simultaneous transaction do not interact, and them occurring simultaneously does not cause a conflict. In 524, the process attempts to write the update to the transaction log associated with a further position N+2. For example, a recursive process is used to confirm an entry at N+2 doesn't exist.

In some embodiments, determining whether the read set associated with a transaction overlaps with the set of updated files associated with a simultaneous transaction additionally comprises other checks for transaction failure. For example, it is determined whether a metadata protocol version comprises an acceptable version, it is determined whether metadata read by the transaction was modified by the simultaneous transaction, it is determined whether a file to be deleted by the transaction was deleted by the simultaneous transaction, it is determined whether a transaction identifier associated with the transaction and a transaction identifier associated with the simultaneous transaction match, etc.

Figure 6:
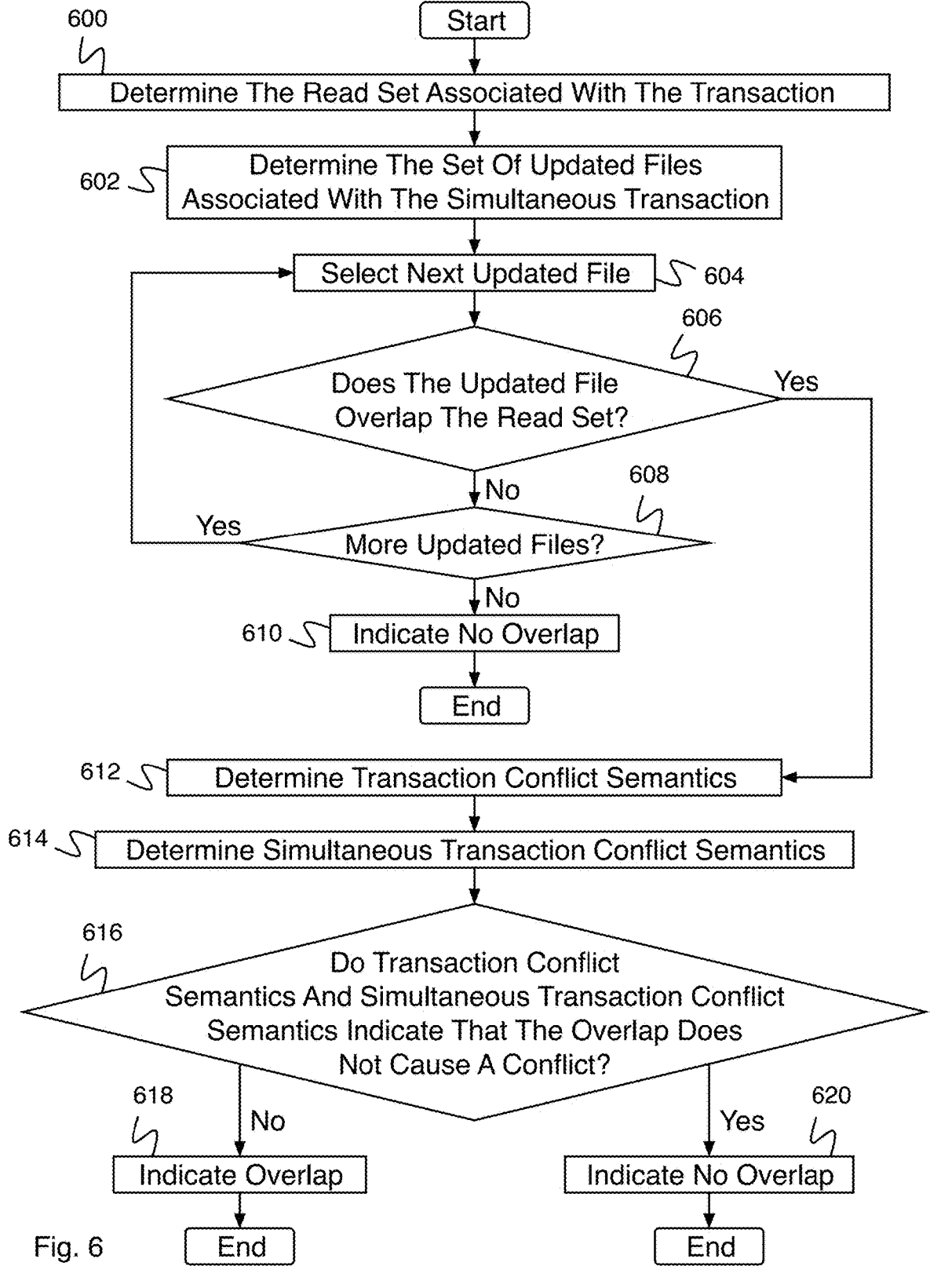
FIG. 6 is a flow diagram illustrating an embodiment of a process for determining whether a read set associated with a transaction overlaps with a set of updated files associated with a simultaneous transaction.

FIG. 6 is a flow diagram illustrating an embodiment of a process for determining whether a read set associated with a transaction overlaps with a set of updated files associated with a simultaneous transaction. In some embodiments, the process of FIG. 6 implements 520 of FIG. 5. In the example shown, in 600, the read set associated with the transaction is determined (e.g., the read set associated with the transaction determined in 508 of FIG. 5). In 602, the set of updated files associated with the simultaneous transaction is determined (e.g., the set of updated files associated with the simultaneous transaction determined in 518 of FIG. 5). In various embodiments, the set of updated files comprises created files, modified files, deleted files, etc. In 604, the next updated file is selected (e.g., of the set of updated files). In some embodiments, the next updated file comprises the first updated file. In 606, it is determined whether the updated file overlaps the read set (e.g., whether the updated file would have been identified by the read set). For example, determining whether the updated file overlaps the read set comprises determining whether a modification made by the simultaneous transaction affects input data for the transaction. In the event it is determined that the updated file overlaps the read set, control passes to 612. In the event it is determined that the updated file does not overlap the read set, control passes to 608. In 608, it is determined whether there are more updated files. In the event it is determined that there are more updated files, control passes to 604. In the event it is determined that there are not more updated files, control passes to 610. In 610, the process indicates no overlap, and the process ends.

In some embodiments, the process ends instead of proceeding to 612. In some embodiments, proceeding to 612 allows you to continue even if there were changes that conflict. However, certain changes (e.g., deletion of a file) are not things that can be ignored. And relevantly, after this process is over it is necessary to check to see whether N+2 exists again (e.g., checking is performed by recursing through the process of FIG. 6).

In 612, transaction conflict semantics are determined. For example, transaction conflict semantics comprise semantic rules specific to the transaction type of the transaction for determining whether update overlaps can create a problem. In 614, simultaneous transaction conflict semantics are determined. For example, transaction conflict semantics comprise semantic rules based on transaction behavior indicating when a file access overlap does not create a semantic conflict (i.e., a conflict that is relevant). For example, a compaction operation reads all files, selects all files below a certain size, and compacts those files into a single large file, e.g., to prevent very large numbers of small files from slowing the file system. Since the compaction operation reads all files, if any other operation acts simultaneously and performs any updates, the transactions will be found to conflict. However, if the simultaneous operation only creates new files without modifying existing files, or if it only modifies or deletes files above the threshold size, the output of the compaction operation will still be valid. This test can be captured in the conflict semantics.

In 616, it is determined whether transaction conflict semantics and simultaneous transaction conflict semantics indicate that the overlap does not cause a conflict. In the event it is determined that transaction conflict semantics and simultaneous transaction conflict semantics do not indicate that the overlap does not cause a conflict, control passes to 618. In 618, the process indicates an overlap, and the process ends. In the event it is determined in 616 that transaction conflict semantics and simultaneous transaction conflict semantics indicate that the overlap does not cause a conflict, control passes to 620. In 620, the process indicates no overlap, and the process ends.

Figure 7:
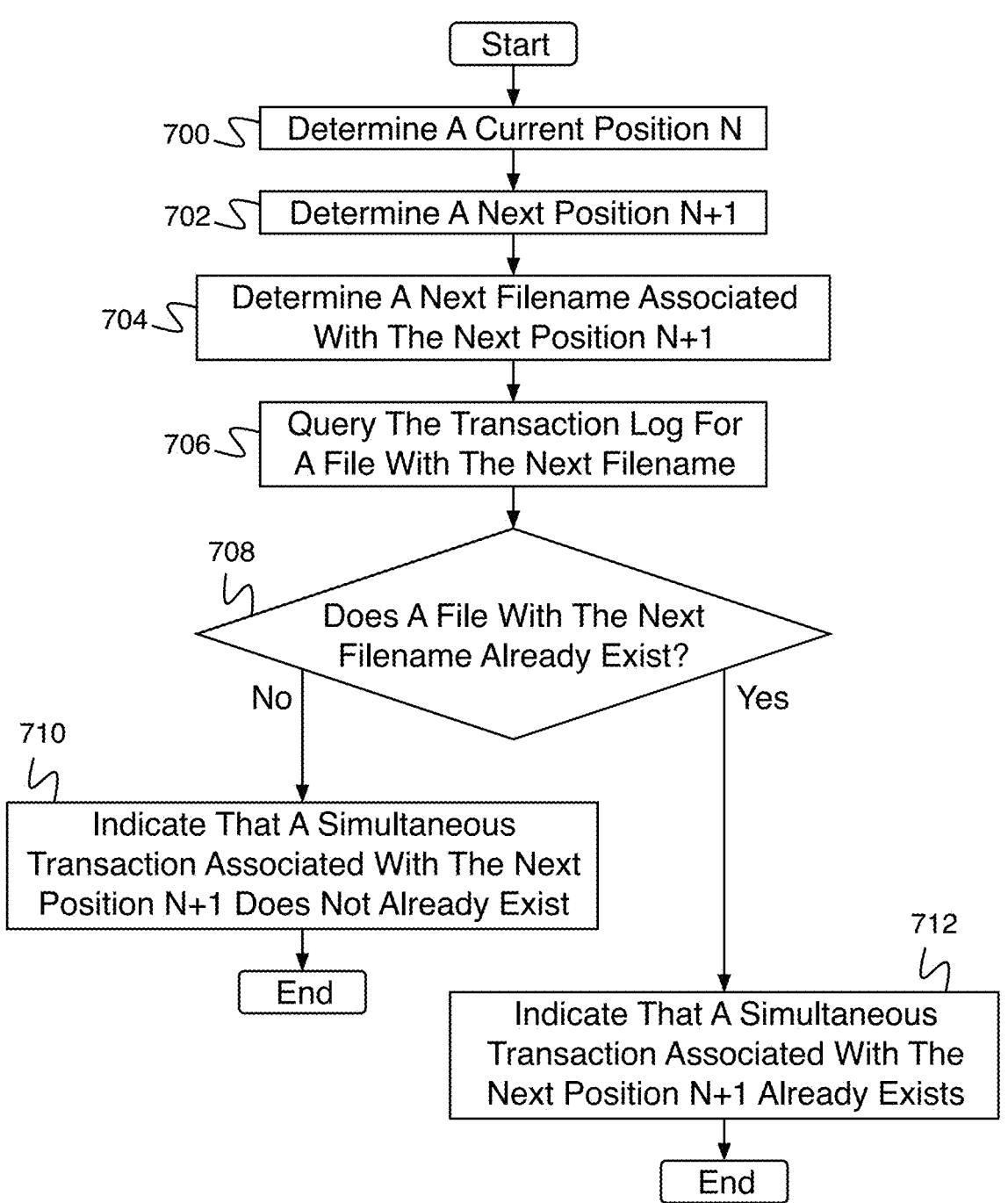
FIG. 7 is a flow diagram illustrating an embodiment of a process for determining whether a simultaneous transaction associated with a next position N+1 already exists.

FIG. 7 is a flow diagram illustrating an embodiment of a process for determining whether a simultaneous transaction associated with a next position N+1 already exists. In some embodiments, the process of FIG. 7 implements 514 of FIG. 5. In the example shown, in 700, a current position N is determined (e.g., the current position N determined in 504 of FIG. 5). In 702, the next position N+1 is determined. For example, the next position N+1 is determined by incrementing the current position N by one. In 704, a next filename associated with the next position N+1 is determined. For example, determining the next filename associated with the next position N+1 comprises determining a filename including the next position N+1, zero padding (e.g., prepending with '0' characters) the next position N+1 to a predetermined total number of digits, concatenating the next position N+1 with a filename string, etc. In 706, the transaction log is queried for a file with the next filename. In 708, it is determined whether a file with the next file name exists. For example, determining whether a file with the next file name exists comprises analyzing the response to querying the transaction log for a file with the next filename. In the event it is determined that a file with the next filename does not already exist, control passes to 710. In 710, the process indicates that a simultaneous transaction associated with the next position N+1 does not already exist, and the process ends. In the event it is determined in 708 that a file with the next filename already exists, control passes to 712. In 712, the process indicates that a simultaneous transaction associated with the next position N+1 already exists.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method, comprising:
accessing metadata of a data table stored in a data storage system, the metadata including a description of a set of data files of the data table and a transaction log, the transaction log recording one or more transactions to the data table;
receiving, from a client device, a transaction indication to perform a transaction on the data table;
in response to a determination that a second transaction exists, determining a read set associated with the transaction, the read set comprising a search predicate for determining one or more data files to read for the transaction;
determining one or more updated data files associated with the second transaction by reading the transaction log, wherein the one or more updated files include updates to the data table that were committed by the second transaction; and
committing an update to at least one data file for the transaction responsive to determining there is no conflict between data in the read set associated with the transaction and data in the one or more updated data files of the second transaction.

2. The method of claim 1, further comprising:
performing at least one or more checks for transaction failure, comprising:
determining whether a metadata protocol version is an acceptable version,
determining whether the metadata of the data table was modified by the second transaction,
determining whether a file for deletion by the transaction was deleted by the second transaction, or
determining whether a transaction identifier associated with the second transaction matches a transaction identifier associated with the transaction, and
wherein the update to the transaction log is committed further responsive to determining that the one or more checks do not indicate transaction failure.

3. The method of claim 1, further comprising:
determining whether there is no overlap or overlap between the read set associated with the transaction and the one or more updated data files for the second transaction;
in response to a determination that there is no overlap between the read set associated with the transaction and the one or more updated data files for the second transaction, committing the update to the at least one data file.

4. The method of claim 3, wherein the determining of whether there is overlap or no overlap between the read set and the one or more updated data files comprises:
determining that no files added, modified, or deleted by the second transaction overlap an element of the read set for the transaction.

5. The method of claim 1, further comprising writing the update for the transaction log at a further position after a position for the second transaction.

6. The method of claim 1, further comprising:
determining whether there is no overlap or overlap between the read set associated with the transaction and the one or more updated data files for the second transaction;
in response to a determination that there is overlap between the read set for the transaction and the one or more updated data files for the second transaction, obtaining semantic rules indicating whether the overlap creates conflict; and
in response to the semantic rules indicating that the overlap does not create conflict between the transaction and the second transaction, committing the update to the at least one data file for the transaction.

7. The method of claim 6, wherein the second transaction is a compaction operation that reads each data file in the set of data files, the method further comprising:

determining that the compaction operation only creates new files for the data table to determine that the overlap does not create conflict between the transaction and the second transaction.

8. The method of claim 1, wherein the second transaction is a transaction on the data table that is committed to the transaction log before the transaction is committed.

9. A non-transitory computer readable storage medium comprising stored program code, the program code comprising instructions, the instructions when executed causes a processor system to:

access metadata of a data table stored in a data storage system, the metadata including a description of a set of data files of the data table and a transaction log, the transaction log recording one or more transactions to the data table;

receive, from a client device, a transaction indication to perform a transaction on the data table;

in response to a determination that a second transaction exists, determine a read set associated with the transaction, the read set comprising a search predicate for determining one or more data files to read for the transaction;

determine one or more updated data files associated with the second transaction by reading the transaction log, wherein the one or more updated files include updates to the data table that were committed by the second transaction; and commit an update to at least one data file for the transaction responsive to determining there is no conflict between data in the read set associated with the transaction and data in the one or more updated data files of the second transaction.

10. The non-transitory computer readable storage medium of claim 9, the instructions when executed further causing the processor system to:

perform at least one or more checks for transaction failure, the instructions when executed further causing the processor system to:

determine whether a metadata protocol version is an acceptable version, determine whether the metadata of the data table was modified by the second transaction, determine whether a file for deletion by the transaction was deleted by the second transaction, or determine whether a transaction identifier associated with the second transaction matches a transaction identifier associated with the transaction, and wherein the update to the transaction log is committed further responsive to determining that the one or more checks do not indicate transaction failure.

11. The non-transitory computer readable storage medium of claim 9, the instructions when executed further causing the processor system to:

determine whether there is no overlap or overlap between the read set associated with the transaction and the one or more updated data files for the second transaction;

in response to a determination that there is no overlap between the read set associated with the transaction and the one or more updated data files for the second transaction, commit the update to the at least one data file.

12. The non-transitory computer readable storage medium of claim 11, the instructions when executed further causing the processor system to:

determine that no files added, modified, or deleted by the second transaction overlap an element of the read set for the transaction.

13. The non-transitory computer readable storage medium of claim 9, the instructions when executed further causing the processor system to write the update for the transaction log at a further position after a position for the second transaction.

14. The non-transitory computer readable storage medium of claim 9, the instructions when executed further causing the processor system to:

determine whether there is no overlap or overlap between the read set associated with the transaction and the one or more updated data files for the second transaction;

in response to a determination that there is overlap between the read set for the transaction and the one or more updated data files for the second transaction, obtain semantic rules indicating whether the overlap creates conflict; and in response to the semantic rules indicating that the overlap does not create conflict between the transaction and the second transaction, commit the update to the at least one data file for the transaction.

15. A computer system, comprising:

a processor system; and a non-transitory computer readable storage medium comprising stored program code, the program code comprising instructions when executed causes the processor system to:

access metadata of a data table stored in a data storage system, the metadata including a description of a set of data files of the data table and a transaction log, the transaction log recording one or more transactions to the data table;

receive, from a client device, a transaction indication to perform a transaction on the data table;

in response to a determination that a second transaction exists, determine a read set associated with the transaction, the read set comprising a search predicate for determining one or more data files to read for the transaction;

determine one or more updated data files associated with the second transaction by reading the transaction log, wherein the one or more updated files include updates to the data table that were committed by the second transaction; and commit an update to at least one data file for the transaction responsive to determining there is no conflict between data in the read set associated with the transaction and data in the one or more updated data files of the second transaction.

16. The computer system of claim 15, the instructions when executed further causing the processor system to:

perform at least one or more checks for transaction failure, the instructions when executed further causing the processor system to:

determine whether a metadata protocol version is an acceptable version, determine whether the metadata of the data table was modified by the second transaction, determine whether a file for deletion by the transaction was deleted by the second transaction, or determine whether a transaction identifier associated with the second transaction matches a transaction identifier associated with the transaction, and wherein the update to the transaction log is committed further responsive to determining that the one or more checks do not indicate transaction failure.

17. The computer system of claim 15, the instructions when executed further causing the processor system to:

determine whether there is no overlap or overlap between the read set associated with the transaction and the one or more updated data files for the second transaction;

in response to a determination that there is no overlap between the read set associated with the transaction and the one or more updated data files for the second transaction, commit the update to the at least one data file.

18. The computer system of claim 17, the instructions when executed further causing the processor system to:

determine that no files added, modified, or deleted by the second transaction overlap an element of the read set for the transaction.

19. The computer system of claim 15, the instructions when executed further causing the processor system to write the update for the transaction log at a further position after a position for the second transaction.

20. The computer system of claim 15, the instructions when executed further causing the processor system to write the update for the transaction log at a further position after a position for the second transaction, determine whether there is no overlap or overlap between the read set associated with the transaction and the one or more updated data files for the second transaction;

in response to a determination that there is overlap between the read set for the transaction and the one or more updated data files for the second transaction, obtain semantic rules indicating whether the overlap creates conflict; and in response to the semantic rules indicating that the overlap does not create conflict between the transaction and the second transaction, commit the update to the at least one data file for the transaction.

\* \* \* \* \*